(12) United States Patent
Griggs

(10) Patent No.: US 8,407,142 B1
(45) Date of Patent: Mar. 26, 2013

(54) MANAGING A UNIVERSAL PAYMENT ACCOUNT

(75) Inventor: Christopher R. Griggs, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 13/200,454

(22) Filed: Sep. 23, 2011

(51) Int. Cl.
*G06Q 20/10* (2012.01)

(52) U.S. Cl. .............................. 705/39; 705/35; 705/38

(58) Field of Classification Search .................... 705/39, 705/35, 37
See application file for complete search history.

(56) References Cited

U.S. PATENT DOCUMENTS

| | | | | |
|---|---|---|---|---|
| 5,192,854 | A * | 3/1993 | Counts | 235/375 |
| 6,715,679 | B1 * | 4/2004 | Infosino | 235/449 |
| 7,630,937 | B1 * | 12/2009 | Mo et al. | 705/39 |
| 2005/0234822 | A1 * | 10/2005 | VanFleet et al. | 705/44 |
| 2007/0150411 | A1 * | 6/2007 | Addepalli et al. | 705/39 |
| 2008/0077514 | A1 * | 3/2008 | Hart | 705/35 |
| 2010/0057580 | A1 * | 3/2010 | Raghunathan | 705/17 |
| 2012/0227094 | A1 * | 9/2012 | Begen et al. | 726/4 |

OTHER PUBLICATIONS

Citi, "Rewards just got even more rewarding," Introducing the new Citi 2G Cards, 2011, 1 page, http://creditcards.citicards.com/usc/10/2g/phl/default.htm?BT_TX+. . . , printed Sep. 26, 2011.
Dynamics Inc., "Dynamic Credit Card™," 2 pages, 2011, http://poweredcards.com/products_dynamic_cc.php, printed Sep. 26, 2011.
Dynamics Inc., "Hidden®," 1 page, 2011, http://www.poweredcards.com/products_hidden.php, printed Sep. 26, 2011.
Dynamics Inc., "MultiAccount™," 1 page, 2011, http://www.poweredcards.com/products_multi.php, printed Sep. 26, 2011.
Dynamics Inc., "Redemption®," 1 page, 2011, http://www.poweredcards.com/redemption.php. printed Sep. 26, 2011.
Bank of America, "SafePass®: Online Banking Security Enhancements—What is SafePass?," 2 pages, 2011, http://www.bankofamerica.com/privacy/index.cfm?template=learn_a . . . , printed Sep. 26, 2011.
Bank of America, "SafePass®: Online Banking Security Enhancements—How it Works," 2 pages, 2011, http://www.bankofamerica.com/privacy/index.cfm?template=learn_a . . . , printed Printed Sep. 26, 2011.
Bank of America, "ShopSafe® Service—What is ShopSafe?," 1 pages, http://www.bankofamerica.com/privacy/index.cfm?template=learn_a . . . , printed Sep. 26, 2011.
Bank of America, "ShopSafe® Service—How It Works," 1 pages, http://www.bankofamerica.com/privacy/index.cfm?template=learn_a . . . , printed Sep. 26, 2011.
U.S. Appl. No. 13/200,455, entitled, "Transaction Device and Processing System," filed Sep. 23, 2011, 38 pages, Printed Sep. 23, 2011.
U.S. Appl. No. 13/200,482, entitled, "Transaction Device and Processing System," filed Sep. 23, 2011, 40 pages, Printed Sep. 23, 2011.
U.S. Appl. No. 13/200,433, entitled, "Transaction Device and Processing System," filed Sep. 23, 2011, 40 pages, Printed Sep. 23, 2011.
U.S. Appl. No. 13/200,439, entitled, "Transaction Device and Processing System," filed Sep. 23, 2011, 40 pages, Printed Sep. 23, 2011.

* cited by examiner

*Primary Examiner* — Jagdish Patel
(74) *Attorney, Agent, or Firm* — Michael A. Springs

(57) ABSTRACT

To facilitate management of a universal payment account, it is determined whether a transaction occurs. Transaction information is received from a payment systems module if the transaction occurs, wherein the transaction information comprises a universal payment identifier associated with a universal payment account. A processor determines at least one payment rule based at least in part on the universal payment identifier, and the processor determines a financial account associated with the universal payment account based upon the at least one payment rule. The plurality of financial accounts are associated with the universal payment account and the determined financial account is used to process the transaction. The determined financial account is accessed to facilitate processing of the transaction.

17 Claims, 3 Drawing Sheets

MANAGING A UNIVERSAL PAYMENT ACCOUNT

TECHNICAL FIELD OF THE INVENTION

This invention relates generally to financial transactions, and more particularly to managing a universal payment account.

BACKGROUND OF THE INVENTION

When conducting financial transactions, customers may pay for the transaction using any suitable payment mode, such as a checking account, a credit card account, a debit account, or other financial account. In order to use the various types of financial accounts, the customer has particular payment modes associated for each account. Therefore, a customer may have to access multiple cards, checkbooks, or applications to use the one of the various financial accounts to complete the transaction.

SUMMARY OF THE INVENTION

According to embodiments of the present disclosure, disadvantages and problems associated with managing a universal payment account may be reduced or eliminated.

In certain embodiments, to facilitate management of a universal payment account, it is determined whether a transaction occurs. Transaction information is received from a payment systems module if the transaction occurs, wherein the transaction information comprises a universal payment identifier associated with a universal payment account. A processor determines at least one payment rule based at least in part on the universal payment identifier, and the processor determines a financial account associated with the universal payment account based upon the at least one payment rule. The plurality of financial accounts are associated with the universal payment account and the determined financial account is used to process the transaction. The determined financial account is accessed to facilitate processing of the transaction.

Certain embodiments of the present disclosure may provide one or more technical advantages. In certain embodiments, a universal payment account is associated with a plurality of financial accounts, and a financial account of the plurality of financial accounts is determined and used to complete a payment transaction. A technical advantage of an embodiment is that a user may use one account to conduct a transaction and still have access to several accounts from which to complete a payment. Therefore, a user would not need to have access to a payment mode for each account to complete the payment from any one of the various accounts. Another technical advantage is that the single account associated with the plurality of accounts may be provided in any suitable payment mode, such as a card, an application on a communications device, a fob, or other payment mode.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
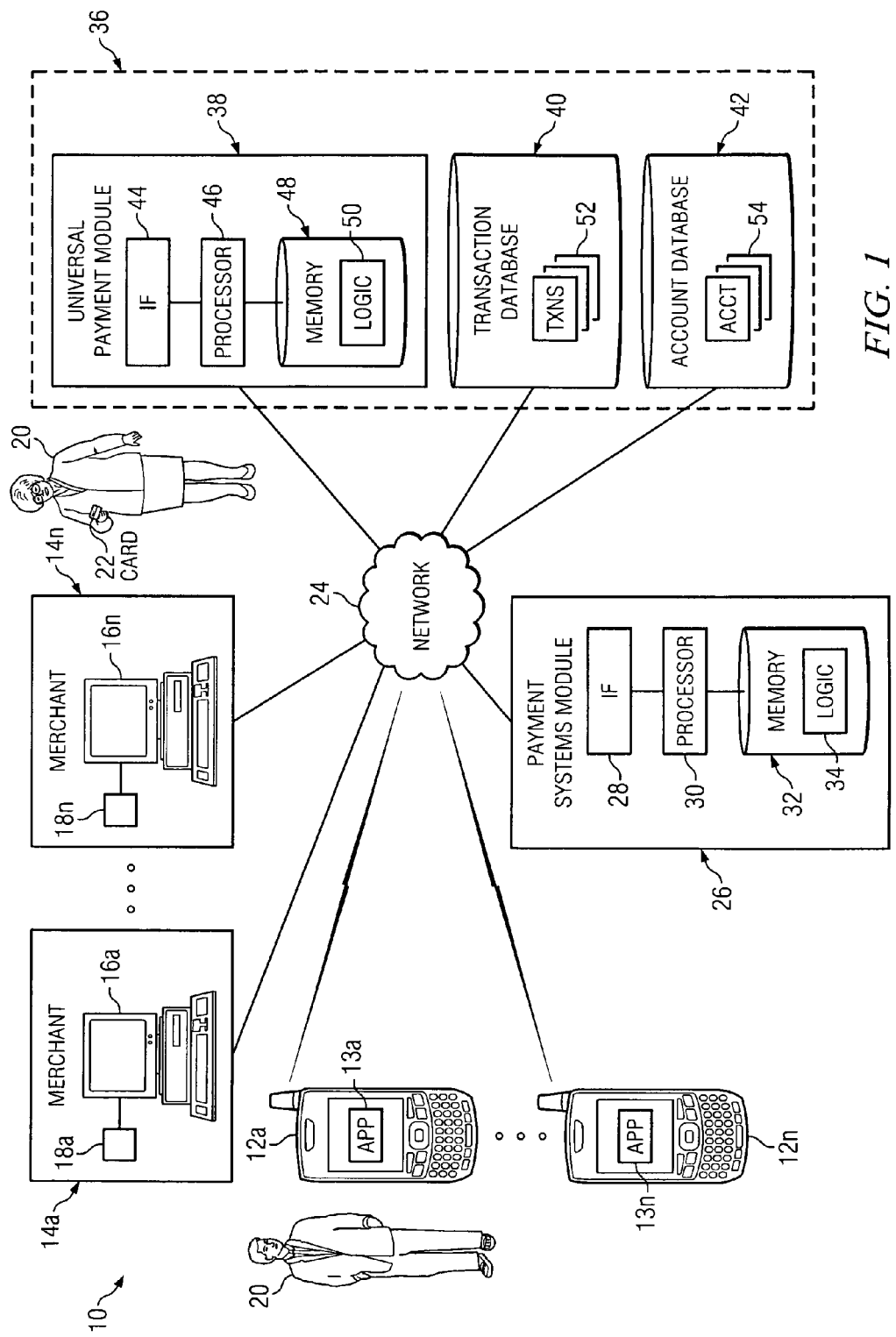
FIG. 1 illustrates a block diagram of an embodiment of a system for managing a universal payment account.
Figure 2:
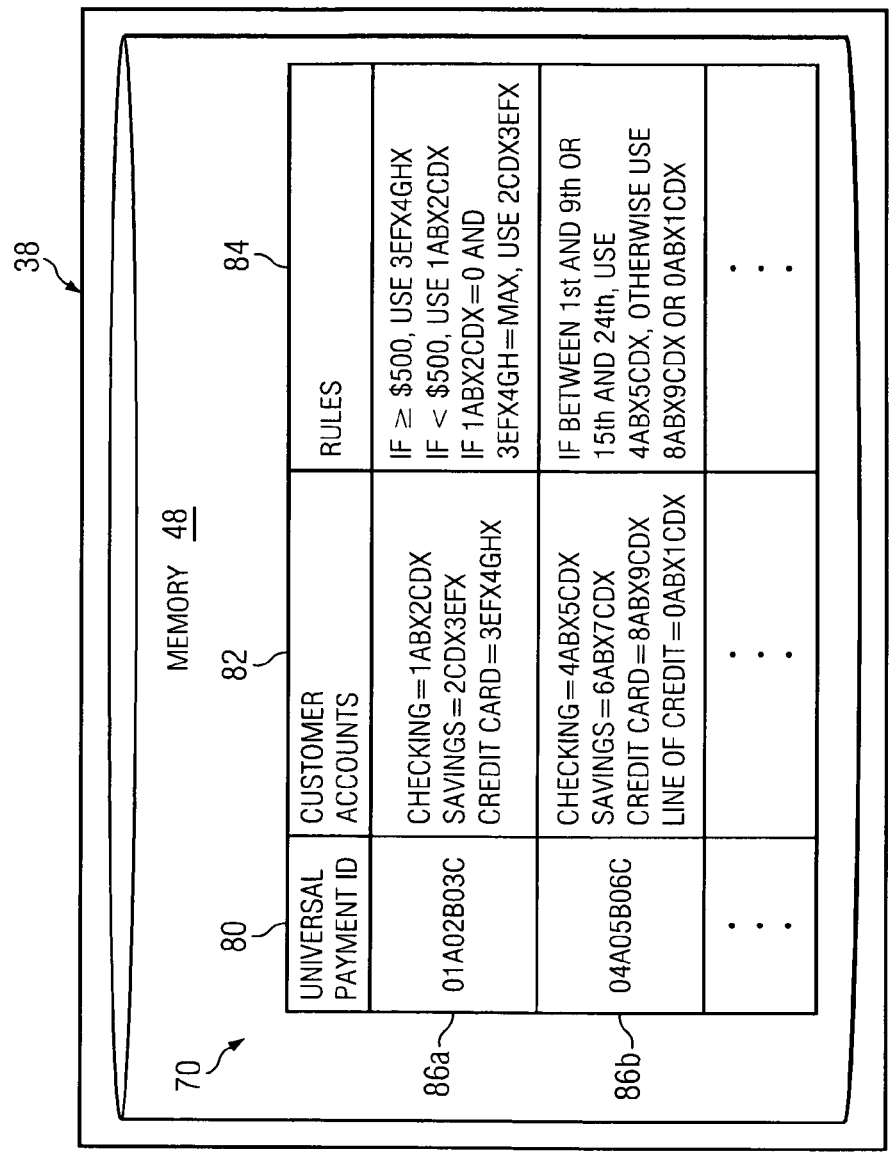
FIG. 2 illustrates a particular embodiment of a memory in a universal payment module that stores payment rules associated with the universal payment account.
Figure 3:
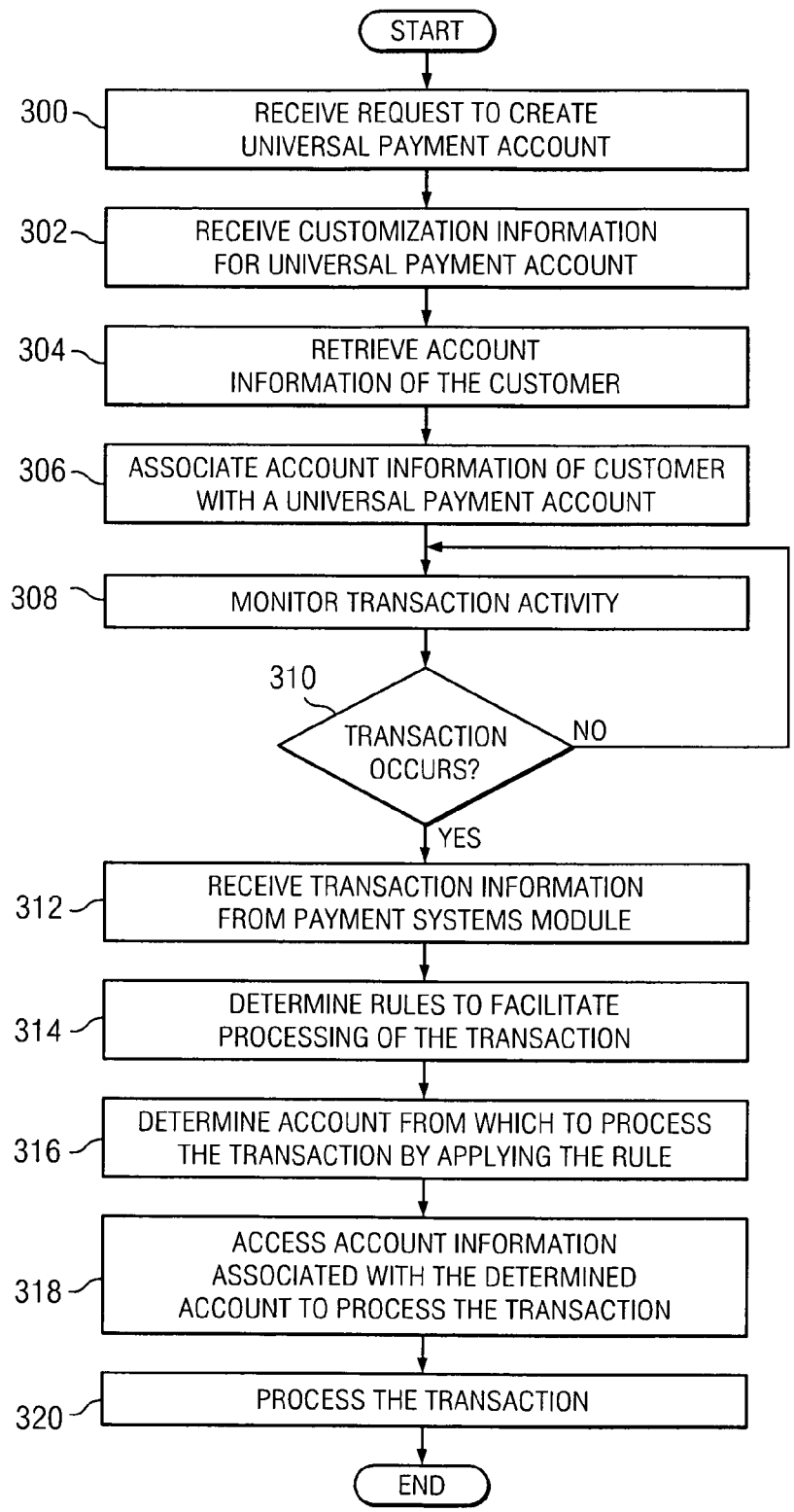
FIG. 3 illustrates a flowchart for managing the universal payment account.

Embodiments of the present invention and its advantages are best understood by referring to FIGS. 1 through 3 of the drawings, like numerals being used for like and corresponding parts of the various drawings.

FIG. 1 illustrates a block diagram of an embodiment of a system 10 for managing a universal payment account. System 10 includes one or more computers 12 and one or more payment devices 16 that communicate over one or more networks 24 with enterprise 36 and/or payment systems module 26 to facilitate management of a universal payment account and use of the universal payment account by a customer to complete a transaction with a merchant. Computer 12 interacts with universal payment module 38 to establish the universal payment account, and payment device 16 interacts with universal payment module 38 to complete a payment transaction initiated by a customer 20.

When conducting a transaction, customer 20 may desire to reduce the number of payment modes available to complete the transaction, but still may desire to have the flexibility of accessing a number of financial accounts to complete the transaction. By reducing the number of payment modes available for a payment transaction, customer 20 also reduces the opportunity of a payment mode being fraudulently used. The teachings of the disclosure recognize that it would be desirable to associate a number of financial accounts with a single universal payment account and use the single universal payment account to complete a transaction, such as purchase goods or services from a merchant. Using the universal payment account, funds or credit associated with the at least one of the various financial accounts may be accessed and used according to predefined rules.

System 10 includes computers 12a-12n, where n represents any suitable number, that communicate with payment devices 16 or enterprise 36 through network 24. Computer 12 may include a personal computer, a workstation, a laptop, a wireless or cellular telephone, an electronic notebook, a personal digital assistant, a smartphone, a netbook, a tablet, a slate personal computer, or any other device (wireless, wireline, or otherwise) capable of receiving, processing, storing, and/or communicating information with other components of system 10. Computer 12 may also comprise a user interface, such as a display, keyboard, mouse, or other appropriate terminal equipment.

Customer 20 may operate computer 12 using application 13. Application 13 represents software operable to execute on computer 12 that may facilitate the creation and use of a universal payment account. Application 13 may execute on computer 12 from local memory or from a remote memory location (e.g., a cloud environment). In certain embodiments, customer 20 accesses application 13 and communicates with enterprise 36 to create the universal payment account. When creating the universal payment account, customer 20 may input account information to facilitate linking a plurality of financial accounts with the universal payment account. Therefore, customer 20 may use a single universal payment account for a transaction, but the transaction may be completed from one of the plurality of financial accounts. To determine from which financial account to complete the transaction, customer 20 may create rules to customize the universal payment account. For example, customer 20 may create a rule that allows a first financial account to be accessed and used to complete transactions that are under a predetermined amount, while a second financial account is accessed and used to complete transactions that are equal to or above the predetermined amount. As another example, customer 20 may create a rule that allows a first financial account to be accessed and used to complete transactions during a predefined time period, such as a time of month or time of year, while a second financial account is accessed and used to complete transactions during another predefined time period. As further examples, customer 20 may create rules to complete transactions according to merchant codes or particular merchants, according to account balances in the financial accounts, or according to a location of customer 20. In other embodiments, customer 20 accesses application 13 to view: account information, transaction history, spending behavior, and/or from which financial account a transaction is paid.

Customer 20 may use computer 12 to create a universal payment account associated with enterprise 36 and to customize the universal payment account according to the customer's preferences. Customer 20 may submit specific parameters to universal payment module 38 to customize the account. For example, once customer 20 creates the universal payment account, various financial accounts may be linked with the universal payment account. In an embodiment, the various financial accounts are associated with enterprise 36. For example, enterprise 36 may maintain the accounts, store records of transactions involving the accounts, transfer money to and from the accounts, or perform other operations associated with the accounts. In another embodiment, the various financial accounts are associated with a plurality of enterprises 36 and/or merchants 14. A financial account may include a savings account, a checking account, a credit card account, a loan account, a line of credit account, a debit account, a rewards account associated with merchant 14, or any other financial account. With respect to the rewards account associated with merchant 14, universal payment account may track rewards accumulated at various merchants 14, and customer 20 may redeem any received awards using the universal payment account. In an embodiment, customer 20 links at least two accounts with the universal payment account. The at least two accounts may be different account types or the same account type.

Additionally, customer 20 may receive information regarding a transaction or universal payment account in any suitable format on computer 12. Customer 20 may also use other suitable means (e.g., telephone or paperwork) to perform these operations. In some embodiments, customer 20 may also use computer 12 to communicate with payment devices 16 to purchase goods or services from a merchant.

Merchant 14 represents entities that offer goods and/or services for customer 20 to purchase, rent, lease, buy, or otherwise acquire. Merchant 14 is an entity in any suitable industry that conducts a transaction with a customer. Merchant 14 may include a retailer, a wholesaler, a service company, or any other suitable entity that has customers 20 and conducts transactions with the customers 20. A transaction may include a payment transaction that includes receiving payment for goods or services from customer 20 or crediting a refund to customer 20. Merchant 14 may use payment device 16 to accept payment from customer 20.

Merchant 14 includes one or more payment devices 16 that may be associated with merchant 14 to facilitate processing of a transaction between merchant 14 and customer 20. For example, payment device 16 may be owned, operated, and/or controlled by merchant 14. In an embodiment, payment device 16 represents a point-of-sale device. Payment devices 16a-16n, where n represents any suitable number, may communicate with computers 12a-12n, enterprise 36, and/or mobile payment systems module 26 through network 24. Payment device 16 may include a web server, a mainframe, a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10. Payment device 16 may also comprise a user interface, such as a display, keyboard, mouse, or other appropriate terminal equipment.

In some embodiments, payment device 16 is a mobile device that is portable and connects to network 24 via a wireless connection. For example, payment device 16 may be a smartphone, a netbook, a notebook, a tablet, or a slate personal computer. In some embodiments, payment device 16 may be coupled to a card reading apparatus 18 via a port, such as an audio or universal serial bus (USB) port. Payment device 16 may be operable to receive a payment transaction that is initiated by a customer swiping a card through card reading apparatus 18.

Customer 20 may use a payment mode 22 to pay for a transaction. Payment mode 22 may be operable to provide an identity of an account of customer 20 to payment device 16 associated with merchant 14. Payment mode 22 may be any suitable medium for communicating the identity of the account of the customer to the payment device 16. For example, payment mode 22 may be a card, radio frequency identification (RFID) tag, a key fob, a software application (e.g., GOOGLE® WALLET), an electronic wallet, a webpage, a widget on a web browser, electronic data, a biometric payment application (e.g., an iris scan, a fingerprint scan, etc.), or other suitable medium.

Payment mode 22 may communicate the identity of an account, such as the universal payment account, to payment device 16 using any suitable method, such as the swiping of a card through card reading apparatus 18 in communication with payment device 16, a transmission of the customer account identifier to payment device 16 (using wired or wireless connections), a manual submission of the customer account identifier into payment device 16 (e.g., keying in a number associated with payment mode 22 into payment device 16), scanning the iris of customer 20, obtaining a fingerprint of customer 20, or other suitable method. Customer 20 may use payment mode 22 for a debit transaction, a credit transaction, a loan transaction, any recurring transaction, such as an Automated Clearinghouse (ACH) transaction, or other type of transaction.

Payment device 16 may communicate with payment systems module 26 to facilitate processing of the payment transaction. Payment systems module 26 may control a payment network that is used for payment processing when payment mode 22 is used in a payment transaction. Payment processing may refer to the process of receiving funds from the customer account and sending funds to the merchant account. For example, after receiving a transaction, payment systems module 26 communicates with enterprise 36 associated with the universal payment account to acquire funds. Payment systems module 26 then facilitates the transfer of funds to the merchant account via the enterprise associated with the merchant account. As an example, a payment network VISA-NET® is typically used for payment processing when a VISA® card is swiped at payment device 16. A payment transaction may be received at payment device 16a and routed to VISANET® through network 24. VISANET® performs the transfer of funds between the enterprises associated with the accounts involved in the transaction. For example, when customer 20 makes a purchase, enterprise 36 associated with the customer account may transfer funds to the VISANET® network and the enterprise associated with the merchant account may receive funds from the VISANET® network (and vice versa for a payment refund).

Payment systems module 26 represents any suitable payment system, such as a credit card system, a debit card system, an ACH system, an electronic system, or other suitable payment system, that facilitates payment processing depending on the type of the payment transaction. Payment systems module 26 may include a network server, any suitable remote server, a mainframe, a host computer, a workstation, a web server, a personal computer, a file server, or any other suitable device operable to communicate with computers 12, payment devices 16, and/or enterprise 36 and process data. In some embodiments, payment systems module 26 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of payment systems module 26 may be performed by any suitable combination of one or more servers or other components at one or more locations. In the embodiment where payment systems module 26 is a server, the server may be a private server, and the server may be a virtual or physical server. The server may include one or more servers at the same or remote locations. Also, universal payment module 38 may include any suitable component that functions as a server. In the illustrated embodiment, payment systems module 26 includes a network interface 28, a processor 30, and a memory 32.

Network interface 28 represents any suitable device operable to receive information from network 24, transmit information through network 24, perform processing of information, communicate with other devices, or any combination of the preceding. For example, network interface 28 receives payment transactions involving customer accounts and merchant accounts. As another example, network interface 28 may communicate transaction information to payment device 16, network 24, and/or enterprise 38. Network interface 28 represents any port or connection, real or virtual, including any suitable hardware and/or software, including protocol conversion and data processing capabilities, to communicate through a local area network (LAN), wide area network (WAN), or other communication system that allows payment systems module 26 to exchange information with network 24, computers 12, payment devices 16, enterprise 38, or other components of system 10.

Processor 30 communicatively couples to network interface 28 and memory 32, and controls the operation and administration of payment systems module 26 by processing information received from network interface 28 and memory 32. Processor 30 includes any hardware and/or software that operates to control and process information. For example, processor 30 executes logic 34 to control the operation of payment systems module 26. Processor 30 may be a programmable logic device, a microcontroller, a microprocessor, any suitable processing device, or any suitable combination of the preceding.

Memory 32 stores, either permanently or temporarily, data, operational software, or other information for processor 30. Memory 32 includes any one or a combination of volatile or non-volatile local or remote devices suitable for storing information. For example, memory 32 may include random access memory (RAM), read only memory (ROM), magnetic storage devices, optical storage devices, or any other suitable information storage device or a combination of these devices. In the illustrated embodiment, memory 32 includes logic 34. Logic 34 generally refers to logic, rules, algorithms, code, tables, and/or other suitable instructions embodied in a computer-readable storage medium for performing the described functions and operations of payment systems module 26. While illustrated as including a particular module, memory 32 may include any suitable information for use in the operation of payment systems module 26.

Network 24 represents any suitable network operable to facilitate communication between the components of system 10, such as computers 12, payment devices 14, enterprise 36, and payment systems module 26. Network 24 may include any interconnecting system capable of transmitting audio, video, signals, data, messages, or any combination of the preceding. Network 24 may include all or a portion of a public switched telephone network (PSTN), a public or private data network, a LAN, a metropolitan area network (MAN), WAN, a local, regional, or global communication or computer network, such as the Internet, a wireline or wireless network, an enterprise intranet, or any other suitable communication link, including combinations thereof, operable to facilitate communication between the components.

Enterprise 36 may represent any individual, business, or organization. One example of an enterprise may include a financial institution. A financial institution may include any individual, business, or organization that engages in financial activities, which may include, but are not limited to, banking and investment activities such as maintaining accounts (e.g., transaction accounts, savings accounts, credit accounts, investment accounts, insurance accounts, portfolios, etc.), receiving deposits, crediting accounts, debiting accounts, extending credit to account holders, purchasing securities, providing insurance, and supervising a customer's portfolio. The financial institution may provide the variety of financial products and services to customers 20. Customer 20 may perform a variety of activities using an account, including contributing funds to the account, withdrawing funds from the account, managing the account, and being responsible or liable for account transactions (e.g., purchases). In some embodiments, enterprise 36 may represent one or more financial institutions, such as a bank, that communicate with computers 12, payment devices 16, and/or payment systems module 26 to facilitate management and use of a universal payment account. In some embodiments, enterprise 26 comprises a group of financial institutions and the universal payment account is associated with various financial accounts of the group of financial institutions.

Universal payment module 38 represents any suitable component that facilitates the management and use of universal payment account by communicating with computers 12, payment devices 16, and payment systems module 26 to process transactions. Universal payment module 38 facilitates the creation of a universal payment account by customer 20. When the universal payment account is created, universal payment module 38 determines account information associated with a plurality of financial accounts of customer 20 and links the plurality of financial accounts with the universal payment account. As discussed further with respect to FIG. 2, universal payment module 38 may store payment rules that govern how the universal payment account is used to complete transactions. Universal payment module 38 may also facilitate viewing of account information, transaction history, spending behavior, and/or from which financial account a transaction is paid.

Universal payment module 38 may include a network server, any suitable remote server, a mainframe, a host computer, a workstation, a web server, a personal computer, a file server, or any other suitable device operable to communicate with computers 12, payment devices 16, and/or payment systems module 26 and process data. In some embodiments, universal payment module 38 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of universal payment module 38 may be performed by any suitable combination of one or more servers or other components at one or more locations. In the embodiment where universal payment module 38 is a server, the server may be a private server, and the server may be a virtual or physical server. The server may include one or more servers at the same or remote locations. Also, universal payment module 38 may include any suitable component that functions as a server. In the illustrated embodiment, universal payment module 38 includes a network interface 44, a processor 46, and a memory 48.

Network interface 44 represents any suitable device operable to receive information from network 24, transmit information through network 24, perform processing of information, communicate with other devices, or any combination of the preceding. For example, network interface 44 receives transactions involving customer accounts and merchant accounts. As another example, network interface 44 may communicate transaction information to payment device 16, network 24, and/or payment systems module 26. As another example, network interface 44 may communicate with computers 12 when customers 20 set up or update a universal payment account. Network interface 44 represents any port or connection, real or virtual, including any suitable hardware and/or software, including protocol conversion and data processing capabilities, to communicate through a LAN, WAN, or other communication system that allows enterprise 36 to exchange information with network 24, computers 12, payment devices 16, payment systems module 26, or other components of system 10.

Processor 46 communicatively couples to network interface 44 and memory 48, and controls the operation and administration of universal payment module 38 by processing information received from network interface 44 and memory 48. Processor 46 includes any hardware and/or software that operates to control and process information. For example, processor 46 executes logic 50 to control the operation of universal payment module 38. Processor 46 may be a programmable logic device, a microcontroller, a microprocessor, any suitable processing device, or any suitable combination of the preceding.

Memory 48 stores, either permanently or temporarily, data, operational software, or other information for processor 46. Memory 48 includes any one or a combination of volatile or non-volatile local or remote devices suitable for storing information. For example, memory 48 may include RAM, ROM, magnetic storage devices, optical storage devices, or any other suitable information storage device or a combination of these devices. In the illustrated embodiment, memory 48 includes logic 50. Logic 50 generally refers to logic, rules, algorithms, code, tables, and/or other suitable instructions embodied in a computer-readable storage medium for performing the described functions and operations of universal payment module 38. While illustrated as including a particular module, memory 48 may include any suitable information for use in the operation of universal payment module 48.

Transaction database 40 stores, either permanently or temporarily, transaction records 52 for customers 20 of enterprise 36. Customers 20 that have accounts with enterprise 36 conduct transactions with merchants 14 and transaction records 52 are stored in transaction database 40. In an embodiment, universal payment module 38 interacts with transaction database 40 to access transaction records 52 and determine the transaction history of customer 20. Based on the transaction history, universal payment module 38 may update payment processing rules or may provide a recommendation to customer 20 regarding updating the payment processing rules. For example, if transactions records 52 indicate that universal payment account accesses the checking account of customer 20 to make payments over $500.00, but the checking account does not have a high balance throughout a particular time period, universal payment module 38 may generate a recommendation regarding from which account customer 20 decides to pay transactions over $500.00. In this example, universal payment module 38 may communicate a recommendation to access a credit card account of customer 20 when the universal payment account is used for transactions over $500.00. Transaction database 40 includes any one or a combination of volatile or non-volatile local or remote devices suitable for storing information. For example, transaction database 40 may include RAM, ROM, magnetic storage devices, optical storage devices, or any other suitable information storage device or combination of these devices.

Account database 42 stores, either permanently or temporarily, data related to financial accounts 54 of customer 20. For example, account database 42 includes accounts 54, and accounts 54 may include investment accounts, checking accounts, savings accounts, credit card accounts, loan accounts, line of credit accounts, debit accounts. Customer 20 may have more than one financial account 54. Information about each account, such as account balance, interest rate, and/or transaction history, may be associated and stored with each account 54. In an embodiment, universal payment module 38 communicates with account database 42 to access financial account 54 that universal payment module 38 determines to use to complete the payment transaction. As discussed above with respect to transaction database 40, universal payment module 38 may update payment processing rules or may provide a recommendation to customer 20 regarding updating the payment processing rules based on the account information in account database 42. Account database 42 includes any one or a combination of volatile or non-volatile local or remote devices suitable for storing information. For example, account database 42 may include RAM, ROM, magnetic storage devices, optical storage devices, or any other suitable information storage device or combination of these devices.

In an exemplary embodiment of operation, customer 20 accesses application 13a to create a universal payment account. To create the universal payment account, customer 20 may input any suitable information into application 13a, such as name, social security number, password, date of birth, financial account information, or other identifying information. Additionally, customer 20 may input information to customize the universal payment account. Universal payment module 38 receives the information and creates the universal payment account. Based on the received information, universal payment module 38 links the plurality of financial accounts identified in the information to the created universal payment account.

When conducting a transaction at merchant 14, customer 20 may use payment mode 22 associated with the universal payment account. Payment device 16 receives payment mode 22 and begins to process the transaction. Payment device 16 communicates with payment systems module 26 to facilitate completion of the transaction. In an embodiment, payment device 16 communicates the universal payment account identifier, merchant identifier, transaction date and/or time, transaction amount, and/or any other information to facilitate processing of the transaction. The information communicated from payment device 16 may be in any suitable identification means, such as a numeric, alphabetical, alphanumeric, or symbolic value.

Payment systems module 26 communicates the received information to universal payment module 38. Universal payment module 38 uses a universal payment account identifier to access the correct universal payment account from which to process the transaction. Universal payment module 38 accesses the universal payment account; determines the payment rules to apply based on the received information from payment systems module 26, such as transaction amount, transaction date, merchant identifier, or other information; and applies the determined payment rule. Based on the application of the payment rule, universal payment module 38 determines from which financial account to complete the transaction. Universal payment module 38 communicates with account database 42 to access the determined financial account, and communicates with payments systems module 26 to complete the transaction from the determined financial account. After processing the transaction, universal payment module 38 may update transaction database 40 with the transaction and account 54 may be updated to reflect the account balance reduction.

According to the above exemplary embodiment of operation, customer 20 uses a single payment mode 20 associated with the universal payment account for a transaction, while universal payment module 38 completes the transaction from any one of a plurality of financial accounts based on payment rules.

A component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, enterprise 36 may include payment systems module 26. Additionally, system 10 may include any number of computers 12, payment devices 16, networks 24, payment systems modules 26, and enterprises 36. Any suitable logic may perform the functions of system 10 and the components within system 10.

FIG. 2 illustrates a particular embodiment of memory 48 in universal payment module 38 that stores payment rules associated with the universal payment account. In the illustrated embodiment, memory 48 comprises a universal payment account database 70 that stores the universal payment account information, the associated financial accounts of customer 20, and the payment rules. Universal payment account database 70 may be stored in universal payment module 38 or may be stored in an external network storage device. Universal payment account database 70 stores, either permanently or temporarily, universal payment account information, the associated financial accounts of customer 20, and the payment rules. Universal payment account database 70 includes any one or a combination of volatile or non-volatile local or remote devices suitable for storing information. For example, universal payment account database 70 may include RAM, ROM, magnetic storage devices, optical storage devices, or any other suitable information storage device or combination of these devices.

Universal payment account database 70 may store the information in any organized manner. In an embodiment, universal payment account database 70 is organized by universal payment account records 86. Each universal payment account record 86 may have any suitable number of fields to represent the account. In certain embodiments, universal payment account record 86 may include some or all of the following fields depicted in FIG. 2: a universal payment identifier field 80, a customer accounts field 82, and a rules field 84.

Universal payment identifier field 80 represents an identifier of the universal payment account. When customer 20 creates the universal payment account, universal payment module 38 may assign any identifier to the universal payment account that identifies the account. Universal payment identifier may be any suitable identification means, such as a numeric, alphabetical, alphanumeric, or symbolic value.

Customer accounts field 82 represents the financial accounts 54 of customer 20 that are associated with the universal payment account. Each financial account 54 is represented by a unique or non-unique identifier. The identifier may be any suitable identification means, such as a numeric, alphabetical, alphanumeric, or symbolic value. Universal payment module 38 may associate any number and/or type of financial accounts 54 with the universal payment account. In an embodiment, universal payment module 38 associates at least two financial accounts 54 with the universal payment account.

Rules field 84 represents the customized payment rules associated with the universal payment account. The customized payment rules indicate how a particular transaction should be processed. As depicted, each universal payment account record 86 has an associated rules field 84. In some embodiments, universal payment module 38 uses the information included in the transaction to determine the applicable rule to use to complete the transaction. In some embodiments, determining the payment rules may also include accessing transaction records 52 in transaction database 40 or accounts 54 in account database 42. For example, a particular payment rule may depend on the account balance of account 54, which may be determined by analyzing data from account 54. As discussed above, customer 20 may establish these rules when creating the universal payment account. In another embodiment, universal payment module 38 may update, add, or delete rules based on transaction history of customer 20. In yet another embodiment, the rules may prioritize from which accounts transactions are paid.

Various example universal payment account records 86 are shown in FIG. 2. Universal payment account record 86a includes a sample universal payment identifier, which is associated with a checking account, a savings account, and a credit card account. Each of the accounts are also identified by an identifier. In record 86a, the customized rules are based on the transaction amount and also on the account balances in the various accounts. For example, according to the first rule, if the transaction is greater than or equal to $500.00, universal payment module 38 will process the transaction using the credit card account. According to the second rule, if the transaction is less than $500.00, universal payment module 38 will process the transaction using the checking account. According to the third rule in record 86a, if the checking account has a balance of zero and the credit card account is at a maximum amount, universal payment module 38 will use the savings account to complete the transaction.

Universal payment account record 86b includes a sample universal payment identifier, which is associated with a checking account, a savings account, a credit card account, and a line of credit account. Each of the accounts are also identified by an identifier. In record 86b, the customized rules are based on the time period in which the transaction occurs. For example, according to the first rule, if the transaction occurs between the first and ninth of the month or between the fifteenth and the twenty-forth of the month, universal payment module 38 will use the checking account. If the transactions occur during any other time of the month, universal payment module 38 may use the credit card account or the line of credit account. The use of either the credit card account or the line of credit account may be based on a pre-defined priority between the accounts.

Modifications, additions, or omissions may be made to universal payment module 38 without departing from the scope of the invention. For example, universal payment module 38 may include separate databases for each of the universal payment identifiers, associated customer financial accounts, and the payment rules. In this example, universal payment module 38 may have an index that links the information associated with customer 20. As another example, universal payment module 38 may have a database that associates the universal payment identifier with the financial accounts and a separates rules engine.

FIG. 3 illustrates a flowchart for managing the universal payment account. At step 300, universal payment module 38 receives a request to create a universal payment account. In an embodiment, universal payment module 38 receives the request from computer 12 on which customer 20 interfaces with application 13. The request may include any suitable information, such as customer identification information; name, address, date of birth, and/or social security number; and/or account identification information. Universal payment module 38 may use the received information to facilitate creation of the universal payment account for customer 20. At step 302, universal payment module 38 receives customization information for the universal payment account. The customization information includes the criteria for which universal payment account 38 completes payment transactions.

Universal payment module 38 retrieves account information of customer 20 at step 304. This account information may include account identifiers, account balances, or other suitable account information to facilitate establishment of the universal payment account. In an embodiment, universal payment module 38 retrieves existing account information from account database 42. In another embodiment, customer 20 may create a new financial account when creating the universal payment account. Universal payment module 38 receives the customer information from computer 12 that facilitates the creation of the new financial account to associate with the universal payment account. At step 306, universal payment module 38 associates the account information of customer 20 with the created universal payment account. In an embodiment, this association between the universal payment account and the financial accounts of customer 20 is stored in universal payment account database 70.

After creation of the universal payment account, universal payment module 38 monitors the transaction activity associated with the account at step 308. At step 310, it is determined whether a transaction occurs. If the transaction does not occur, the transaction activity continues to be monitored. Alternatively, if a transaction does occur, the method proceeds to step 312.

At step 312, universal payment module 38 receives the transaction information from payment systems module 26. Using the received information, universal payment module 38 determines the rules to facilitate processing of the transaction at step 314. For example, the transaction information may include a universal payment account identifier, and universal payment module 38 determines a universal payment record 86 according to the universal payment identifier. Universal payment module 38 accesses the rules associated with the universal payment identifier and determines the rule to apply. In an embodiment, the determination of which rule to apply depends at least on a portion of the transaction information. For example, if the rule is based on the transaction amount, universal payment module 38 determines the transaction amount from the transaction information and then selects the applicable payment rule. As another example, if the rule is based on the time period, universal payment module 38 determines the transaction date and/or time and then selects the applicable payment rule.

Once universal payment module 38 determines the appropriate rule, the financial account to use to process the transaction is determined at step 316. Universal payment module 38 determines the appropriate account to access by applying the rule. At step 318, universal payment module 38 accesses the account information associated with the determined account to process the transaction, and the transaction is processed at step 320. To process the transaction, universal payment module 38 may communicate with payment systems module 26, payment device 16, computer 12, and/or customer 20.

Modifications, additions, or omissions may be made to method depicted in FIG. 3. The method may include more, fewer, or other steps. Additionally, steps may be performed in parallel or in any suitable order. Any suitable component of system 10 may perform one or more steps of the method.

Certain embodiments of the present disclosure may provide one or more technical advantages. In certain embodiments, a universal payment account is associated with a plurality of financial accounts, and a financial account of the plurality of financial accounts is determined and used to complete a payment transaction. A technical advantage of an embodiment is that a user may use one account to conduct a transaction and still have access to several accounts from which to complete a payment. Therefore, a user would not need to have access to a payment mode for each account to complete the payment from any one of the various accounts. Another technical advantage is that the single account associated with the plurality of accounts may be provided in any suitable payment mode, such as a card, an application on a communications device, a fob, or other payment mode.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for managing a universal payment account, comprising:
    a network interface configured to receive transaction information from a payment systems module if a transaction occurs, wherein the transaction information comprises a universal payment identifier associated with a universal payment account to complete the transaction;
    a processor communicatively coupled to the network interface, the processor configured to:
        determine at least one payment rule based at least in part on the universal payment identifier;
        determine a financial account associated with the universal payment account based upon the at least one payment rule, wherein a plurality of financial accounts are associated with the universal payment account and the determined financial account is used to process the transaction;
        access the determined financial account to facilitate processing of the transaction;
        monitor transaction activity associated with the universal payment account; and
        determine a new payment rule according to the transaction activity.

2. The system of claim 1, wherein the processor is configured to perform at least one of the following:
    determine the financial account according to an amount of the transaction;
    determine the financial account according to a time of the transaction;
    determine the financial account according to a merchant code included within the transaction; and
    determine the financial account according to a balance of a financial account of the plurality of financial accounts.

3. The system of claim 1, wherein the processor is configured to determine the financial account based on a priority among the plurality of financial accounts associated with the universal payment account.

4. The system of claim 1, wherein the processor is configured to apply the at least one payment rule to determine the financial account associated with the universal payment account from which to process the transaction.

5. The system of claim 1, wherein the plurality of financial accounts associated with the universal payment account comprise at least two of a savings account, a checking account, a credit card account, a loan account, a line of credit account, and a debit account.

6. The system of claim 1, wherein:
    the network interface is configured to:
        receive instructions to create the universal payment account, wherein the instructions comprise a customer identifier; and
        receive customization information for the universal payment account; and
    the processor is configured to:
        retrieve account information associated with the customer identifier; and
        associate the account information with the universal payment account.

7. Non-transitory computer readable medium comprising logic, the logic, when executed by a processor, operable to:
    receive transaction information from a payment systems module if a transaction occurs, wherein the transaction information comprises a universal payment identifier associated with a universal payment account to complete the transaction;
    determine at least one payment rule based at least in part on the universal payment identifier;
    determine a financial account associated with the universal payment account based upon the at least one payment rule, wherein a plurality of financial accounts are associated with the universal payment account and the determined financial account is used to process the transaction;
    access the determined financial account to facilitate processing of the transaction;
    monitor transaction activity associated with the universal payment account; and
    determine a new payment rule according to the transaction activity.

8. The computer readable medium of claim 7, wherein determining the financial account comprises at least one of:
    determining the financial account according to an amount of the transaction;
    determining the financial account according to a time of the transaction;
    determining the financial account according to a merchant code included within the transaction; and
    determining the financial account according to a balance of a financial account of the plurality of financial accounts.

9. The computer readable medium of claim 7, the logic is further operable to apply the at least one payment rule to determine the financial account associated with the universal payment account from which to process the transaction.

10. The computer readable medium of claim 7, wherein the plurality of financial accounts associated with the universal payment account comprise at least two of a savings account, a checking account, a credit card account, a loan account, a line of credit account, and a debit account.

11. The computer readable medium of claim 7, the logic is further operable to:
    receive instructions to create the universal payment account, wherein the instructions comprise a customer identifier;
    receive customization information for the universal payment account;
    retrieve account information associated with the customer identifier;
    associate the account information with the universal payment account.

12. A method for managing a universal payment account, comprising:
    receiving transaction information from a payment systems module if a transaction occurs, wherein the transaction information comprises a universal payment identifier associated with a universal payment account to complete the transaction;
    determining, by a processor, at least one payment rule based at least in part on the universal payment identifier;
    determining, by the processor, a financial account associated with the universal payment account based upon the at least one payment rule, wherein a plurality of financial accounts are associated with the universal payment account and the determined financial account is used to process the transaction;
    accessing the determined financial account to facilitate processing of the transaction;
    monitoring transaction activity associated with the universal payment account; and
    determining a new payment rule according to the transaction activity.

13. The method of claim 12, wherein determining the financial account comprises at least one of:

determining the financial account according to an amount of the transaction;

determining the financial account according to a time of the transaction;

determining the financial account according to a merchant code included within the transaction; and determining the financial account according to a balance of a financial account of the plurality of financial accounts.

14. The method of claim 12, wherein determining the financial account comprises determining the financial account based on a priority among the plurality of financial accounts associated with the universal payment account.

15. The method of claim 12, further comprising applying the at least one payment rule to determine the financial account associated with the universal payment account from which to process the transaction.

16. The method of claim 12, wherein the plurality of financial accounts associated with the universal payment account comprise at least two of a savings account, a checking account, a credit card account, a loan account, a line of credit account, and a debit account.

17. The method of claim 12, further comprising:

receiving instructions to create the universal payment account, wherein the instructions comprise a customer identifier;

receiving customization information for the universal payment account;

retrieving account information associated with the customer identifier;

associating the account information with the universal payment account.

* * * * *